US009695086B2

(12) United States Patent
Terasaki et al.

(10) Patent No.: US 9,695,086 B2
(45) Date of Patent: Jul. 4, 2017

(54) TREATMENT DEVICE AND TREATMENT METHOD FOR CHLORINE BYPASS DUST

(75) Inventors: Junichi Terasaki, Chiba (JP); Kenzaburou Kondou, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 221 days.

(21) Appl. No.: 13/806,297

(22) PCT Filed: Jun. 8, 2011

(86) PCT No.: PCT/JP2011/063133
§ 371 (c)(1),
(2), (4) Date: Jan. 24, 2013

(87) PCT Pub. No.: WO2011/162101
PCT Pub. Date: Dec. 29, 2011

(65) Prior Publication Data
US 2013/0192497 A1 Aug. 1, 2013

(30) Foreign Application Priority Data

Jun. 22, 2010 (JP) .................... 2010-141201

(51) Int. Cl.
*B01D 53/86* (2006.01)
*C04B 7/60* (2006.01)
(Continued)

(52) U.S. Cl.
CPC .............. *C04B 7/60* (2013.01); *B09B 3/0025* (2013.01); *C04B 7/436* (2013.01); *F27D 17/00* (2013.01);
(Continued)

(58) Field of Classification Search
CPC ....... B01D 53/86; B01D 53/508; B01D 53/62
(Continued)

(56) References Cited

U.S. PATENT DOCUMENTS

2007/0098035 A1* 5/2007 Shinichiro et al. ............... 373/8
2008/0092739 A1* 4/2008 Saito et al. ..................... 95/288

FOREIGN PATENT DOCUMENTS

| JP | 2000313645 A | 11/2000 |
|---|---|---|
| JP | 2007119830 A | 5/2007 |
| JP | 2010001176 | 7/2010 |

OTHER PUBLICATIONS

European Search Report, May 30, 2014, 6 pages, Munich Germany.

* cited by examiner

*Primary Examiner* — Matthew E Hoban
*Assistant Examiner* — James Fiorito
(74) *Attorney, Agent, or Firm* — Stetina Brunda Garred and Brucker; Mark B. Garred

(57) ABSTRACT

In accordance with the present invention, there is provided a treat chlorine bypass dust while preventing increases in chemical cost and concentrations of heavy metals in clinker, and ensuring stability in quality of cement. In a chlorine bypass facility 1 extracting a part G of combustion gas, while cooling it, from a kiln exhaust gas passage, which runs from an inlet end of a cement kiln to a bottom cyclone, and recovering a high chlorine concentration chlorine bypass dust D5 from the extracted gas G1, a slurry S containing chlorine bypass dust and $SO_2$ gas or/and $CO_2$ gas are contacted with each other to obtain solid content. The slurry containing chlorine bypass dust and an exhaust gas from the chlorine bypass facility or/and the exhaust gas from the cement kiln can be contacted with each other, and the solid content can be fed to a cement finishing process, which allows cement with low CaO and $Ca(OH)_2$ contents and with stable property such as setting time to be produced.

11 Claims, 2 Drawing Sheets

(51) Int. Cl.
*C04B 7/43* (2006.01)
*B09B 3/00* (2006.01)
*F27D 17/00* (2006.01)
*B01D 53/50* (2006.01)
*B01D 53/62* (2006.01)

(52) U.S. Cl.
CPC ............ *B01D 53/508* (2013.01); *B01D 53/62* (2013.01); *B01D 53/86* (2013.01)

(58) Field of Classification Search
USPC .......... 423/210, 215.5, 243.01; 422/168, 187
See application file for complete search history.

TREATMENT DEVICE AND TREATMENT METHOD FOR CHLORINE BYPASS DUST

CROSS-REFERENCE TO RELATED APPLICATIONS

The present application claims priority to International Application No. PCT/JP2011/063133 filed Jun. 8, 2011, which claims priority to Japanese Patent Application No. 2010-141201 filed Jun. 22, 2010.

STATEMENT RE: FEDERALLY SPONSORED RESEARCH/DEVELOPMENT

Not Applicable

BACKGROUND OF THE INVENTION

1. Technical Field of the Invention

The present invention relates to a method and an apparatus for treating high chlorine concentration chlorine bypass dust that is recovered from a chlorine bypass system attached to a cement manufacturing facility.

2. Description of the Related Art

Chlorine bypass systems have been used to remove chlorine that may cause troubles such as preheater clogging in cement manufacturing facilities. In recent years, recycling of waste through conversion to cement raw material or fuel has been promoted, which increases the quantity of volatile matters such as chlorine, and the quantity of chlorine bypass dust generated as the quantity of the treated waste increases, which necessitates developments of methods for effectively utilizing the chlorine bypass dust.

From the above-mentioned point of view, in a treatment method through conversion to cement raw material described in Patent Documents 1 and 2, to wastes containing chlorine is added water to allow the chlorine in the wastes to be eluted and filtrated; desalted cake obtained is utilized as a cement raw material; pH of waste water is adjusted to precipitate heavy metals and collect them; and the waste water from which heavy metals are collected is discharged after salt is recovered therefrom or as it is.

However, in the above-mentioned invention described in the Patent Documents 1 and 2, heavy metals remain in a desalted cake, and sludge recovered in waste water treatment contains heavy metals also, therefore, when the desalted cake and the sludge are returned to a cement raw material system, heavy metals are concentrated in a cement burning system while circulating therein, which may cause problems such as increased chemical cost for waste water treatment and increased concentrations of heavy metals in clinker.

On the other hand, in a method and an apparatus for treating chlorine bypass dust described in Patent Document 3, slurry obtained by adding water to a chlorine bypass dust is stored, the stored slurry is fed to a cement finishing process together with at least one selected from the group consisting of clinker, gypsum and admixture, and those are crushed while being mixed in a mill for cement production. With this method, heavy metals contained in the chlorine bypass dust is not concentrated while circulating in the cement burning system, which prevents increases in the chemical cost and concentrations of heavy metals in clinker described above.

Patent document 1: Japan Patent No. 3304300 gazette
Patent document 2: Japan Patent No. 4210456 gazette
Patent document 3: Japan Patent No. 4434361 gazette However, in the treatment method described in Patent Document 3, water is added to the chlorine bypass dust to generate slurry, which causes CaO in the chlorine bypass dust to be converted to Ca(OH)2 through slaking. Therefore, CaO, Ca(OH)2 and CaCO3 that are unreacted and remain as calcium compounds exist in a mixed state in the slurry, so that when this slurry is fed to a cement finishing process, CaO and Ca(OH)2 contents in produced cement fluctuate, which may affect properties such as setting time.

The present invention has been made in consideration of the above problems in the conventional art, and the object thereof is to treat chlorine bypass dust while preventing increases in chemical cost and concentrations of heavy metals in clinker, and ensuring stability in quality of cement.

SUMMARY OF THE INVENTION

To achieve the above object, the present invention relates to a method of treating chlorine bypass dust, characterized by, in a chlorine bypass facility extracting a part of combustion gas, while cooling it, from a kiln exhaust gas passage, which runs from an inlet end of a cement kiln to a bottom cyclone, and recovering a high chlorine concentration chlorine bypass dust from the extracted gas, obtaining solid content by contacting a slurry containing the chlorine bypass dust and $SO_2$ gas or/and $CO_2$ gas with each other, and determining time for reacting the slurry containing the chlorine bypass dust to the $SO_2$ gas or/and the $CO_2$ gas by at least one selected from the group consisting of: rate of decrease in the $SO_2$ gas or/and the $CO_2$ gas when obtaining the solid content; pH of the slurry after being reacted with the $SO_2$ gas or/and the $CO_2$ gas, and chemical analysis value of the chlorine bypass dust.

And, with the present invention, contacting a slurry containing chlorine bypass dust and $SO_2$ gas or/and $CO_2$ gas with each other allows CaO and $Ca(OH)_2$ contained in the slurry to be recovered to gypsum ($CaSO_4$) or/and calcium carbonate ($CaSO_3$), and solid content with low CaO and $Ca(OH)_2$ contents can be obtained.

In the above method of treating chlorine bypass dust, the slurry containing chlorine bypass dust and an exhaust gas from the chlorine bypass facility or/and the exhaust gas from the cement kiln can be contacted with each other. With this, the exhaust gas can effectively be utilized, contributing to decrease in environment load.

In addition, in the above method of treating chlorine bypass dust, the solid content can be fed to a cement finishing process. Since contents of CaO and $Ca(OH)_2$ in the solid content are low, it is much less likely to affect property such as setting time, and the chlorine bypass dust can be treated while ensuring stability in cement quality.

In the above method of treating chlorine bypass dust, the solid content can be obtained after controlling pH of the slurry containing the chlorine bypass dust after contacted to the $SO_2$ gas or/and the $CO_2$ gas. In this case, pH of the slurry can be adjusted 7.0 or more and 10.5 or less. With this, it is possible to unevenly distribute heavy metals that are precipitated by the pH control on the solid content side, which decreases cost of chemicals required for waste water treatment and restrains concentration of heavy metals due to circulation in the cement burning system.

In addition, the present invention relates to an apparatus for treating chlorine bypass dust comprising: a dissolution tank for slurring a high chlorine concentration chlorine bypass dust recovered from a part of combustion gas, which extracted, while being cooled, from a kiln exhaust gas passage, which runs from an inlet end of a cement kiln to a bottom cyclone; a gas introduction device for introducing $SO_2$ gas or/and $CO_2$ gas to the dissolution tank; and a solid/liquid separator for solid/liquid separating a slurry discharged from the dissolution tank, wherein the dissolution tank obtains solid content by contacting a slurry containing the chlorine bypass dust and $SO_2$ gas or/and $CO_2$ gas with each other, and determines time for reacting the slurry containing the chlorine bypass dust to the $SO_2$ gas or/and the $CO_2$ gas by at least one selected from the group consisting of: rate of decrease in the $SO_2$ gas or/and the $CO_2$ gas when obtaining the solid content; pH of the slurry after being reacted with the $SO_2$ gas or/and the $CO_2$ gas, and chemical analysis value of the chlorine bypass dust. With the present invention, in the dissolution tank, contacting a slurry containing chlorine bypass dust and $SO_2$ gas or/and $CO_2$ gas with each other allows CaO and $Ca(OH)_2$ contained in the slurry to be converted as $CaSO_4$ or/and $CaSO_3$, and solid content with low CaO and $Ca(OH)_2$ contents can be obtained.

As described above, with the present invention, it is possible to treat chlorine bypass dust while preventing increases in chemical cost and concentrations of heavy metals in clinker, and ensuring stability in cement quality.

DETAILED DESCRIPTION OF THE INVENTION

Next, embodiments to carry out of the present invention will be explained in detail with reference to drawings.

Figure 1:
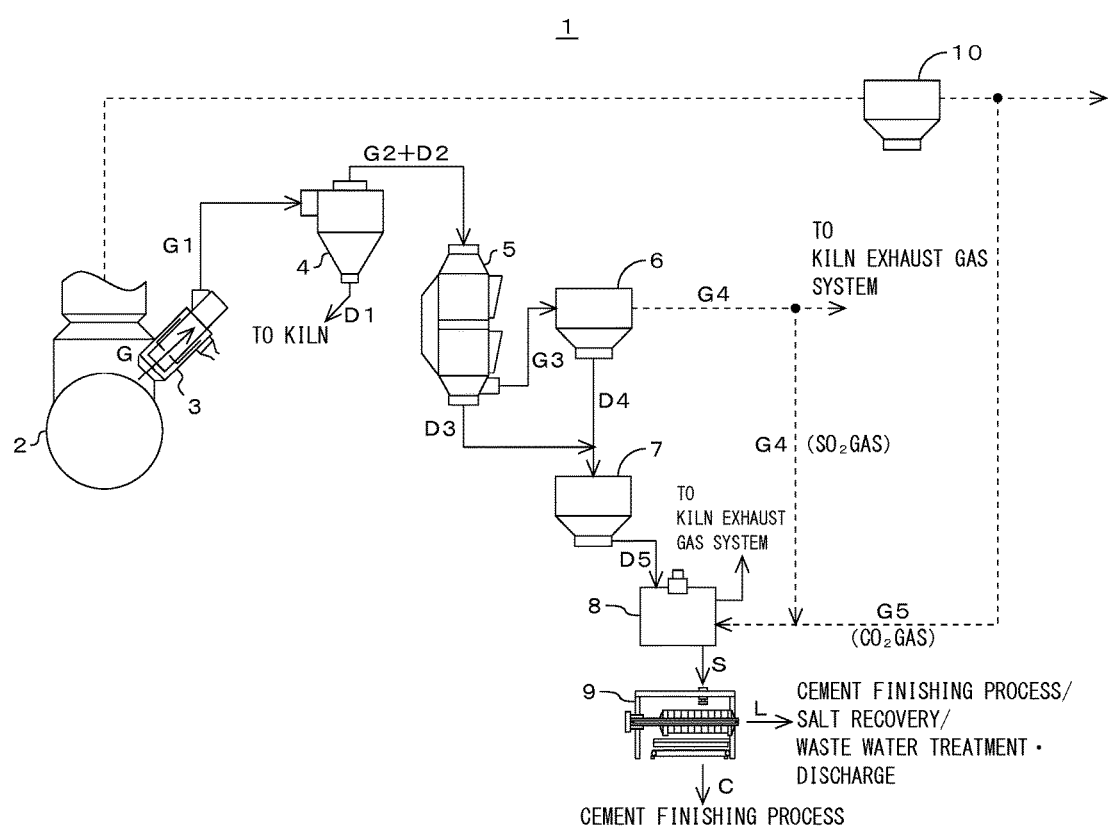
FIG. 1 is a schematic view showing the first embodiment of a chlorine bypass dust treatment apparatus according to the present invention.

FIG. 1 shows a chlorine bypass facility with an apparatus for treating chlorine bypass dust according to the first embodiment of the present invention, and this chlorine bypass facility 1 comprises: a probe 3 for extracting a part G of combustion gas from a kiln exhaust gas passage, which runs from an inlet end of a cement kiln 2 to a bottom cyclone (not shown); a cyclone 4 for separating coarse powder D1 from dust included in an extracted gas G1 extracted by the probe 3; a heat exchanger 5 for cooling an extracted combustion gas G2 including fine powder D2 discharged from the cyclone 4; a bag filter 6 for collecting dust contained in an extracted gas G3 from the heat exchanger 5; a dust tank 7 for temporarily storing dusts (D3+D4) discharged from the heat exchanger 5 and bag filter 6; a dissolution reaction tank 8 for dissolving the dust (chlorine bypass dust) D5 discharged from the dust tank 7 with water and reacting the dust D5 with $SO_2$ gas and $CO_2$ gas; a solid/liquid separator 9 for solid/liquid separating a slurry S discharged from the dissolution reaction tank 8. The construction from the probe 3 to the dust tank 7 is the same as that of conventional chlorine bypass facilities, so that explanations thereof will be omitted.

The dissolution reaction tank 8 is installed to slurry the dust D5 from the dust tank 7 with water (or hot water), and to the dissolution reaction tank 8 is supplied the exhaust gas G4 including $SO_2$ gas from the bag filter 6 or/and the exhaust gas G5 including $CO_2$ gas from the cement kiln 2, which allows calcium compounds contained in the slurry and $SO_2$ gas and $CO_2$ gas to react with each other. In this connection, as the dissolution reaction tank 8, a packed tower, a perforated-plate tower, a venturi scrubber, a spray tower, a mixing-type scrubber, a diffusion plate or the like may be used, and those may be any one of continuous type and batch type. All or a part of the exhaust gas G4 can be introduced to the dissolution reaction tank 8. It is preferable that all of the exhaust gas G4 is introduced to the dissolution reaction tank 8 because acidic gas contained in the exhaust gas G4 can be removed. On the other hand, when a part of the exhaust gas G4 is utilized, the gas G4 that is not introduced to the dissolution reaction tank 8, and a gas discharged from the dissolution reaction tank 8 are introduced to a kiln exhaust gas system such as a preheater and a preheater outlet.

The solid/liquid separator 9 is installed to solid/liquid separate the slurry S, which reacted with the exhaust gas G4 and the exhaust gas G5 in the dissolution reaction tank 8. As the solid/liquid separator 9, a filter press, a centrifugal separator, a belt filter, or the like may be used.

Next, the motion of the chlorine bypass facility 1 with the above-mentioned construction will be explained with reference to FIG. 1.

The part G of the combustion gas extracted from the kiln exhaust gas passage, which runs from the inlet end of the cement kiln 2 to the bottom cyclone, is cooled in the probe 3 with a cooling air from a cooling fan (not shown), and fine crystals of chloride compounds are generated. These fine crystals of chloride compounds are unevenly distributed on the fine powder side of the dust included in the extracted gas G1, so that the coarse dust D1 separated by the cyclone 4 is returned to the cement kiln system.

The extracted gas G2 containing the fine dust D2 separated by the cyclone 4 is introduced to the heat exchanger 5 to perform heat exchange between the extracted gas G2 and a medium. The extracted gas G3 cooled by the heat exchange is introduced to the bag filter 6, and the dust D4 contained in the extracted gas G3 is collected in the bag filter 6. The dust D4 collected in the bag filter 6 is temporarily stored together with the dust D3 discharged from the heat exchanger 5 in the dust tank 7, and is introduced to the dissolution reaction tank 8.

The dust D5 introduced to the dissolution reaction tank 8 becomes the slurry S after mixed with water in the dissolution reaction tank 8. Here, in the slurry S exist CaO, $CaCO_3$ and $Ca(OH)_2$ as calcium compounds in a mixed state, and CaO and $Ca(OH)_2$ are converted into $CaSO_4$ and $CaCO_3$ after reacting with $SO_2$ contained in the exhaust gas G4 and $CO_2$ contained in the exhaust gas G5. At the reaction between CaO, $Ca(OH)_2$ and $SO_2$, $CO_2$, residence time of the slurry S in the dissolution reaction tank 8 is adjusted based on rate of decrease in the exhaust gases G4, G5 (rate of decrease in the $SO_2$, $CO_2$ gases), pH of the slurry in the dissolution reaction tank 8, chemical analysis value of the dust D5, and so on.

Next, the slurry S discharged from the dissolution reaction tank 8 is solid/liquid separated in the solid/liquid separator 9, and obtained solid content C is fed to a cement finishing process. On the other hand, in the filtrate L discharged from the solid/liquid separator 9 is included salt and heavy metals, so that treatments of the salt and the heavy metals are performed by adding them to a cement finishing process while considering quality of cement as a product. Meanwhile, the filtrate L which could not be added to the cement finishing process is released after recovering salt and heavy metals.

As described above, in the present embodiment, CaO and $Ca(OH)_2$, which may affect quality of a product when added to a cement, are reacted with $SO_2$ and $CO_2$ gases to convert them to $CaSO_4$ and $CaCO_3$, and then solid content obtained by dehydration is supplied to a cement finishing process, so that it is possible to produce cement with low CaO and $Ca(OH)_2$ contents, which does not affect property such as setting time and allows the chlorine bypass dust to be treated while ensuring stability in cement quality.

Figure 2:
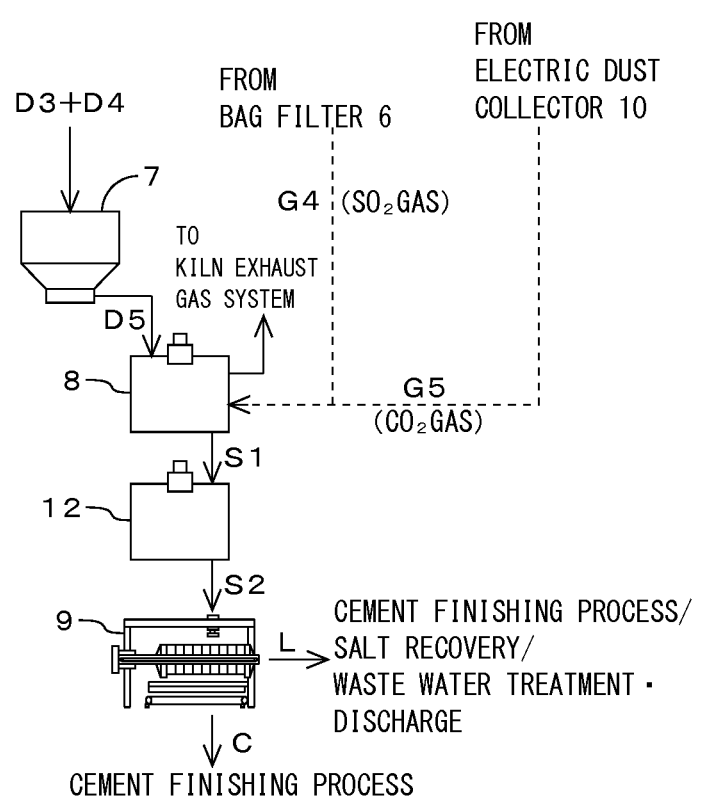
FIG. 2 is a schematic view showing the second embodiment of a chlorine bypass dust treatment apparatus according to the present invention.

Next, the second embodiment of the apparatus for treating chlorine bypass dust according to the present invention will be explained with reference to FIG. 2.

The present embodiment is characterized by installing a pH control tank 12 between the dissolution reaction tank 8 and solid/liquid separator 9 shown in FIG. 1, and other components are the same as those of the above-mentioned chlorine bypass facility 1. Then, in FIG. 2, to the same components as the chlorine bypass facility 1 shown in FIG. 1 are attached the same symbols, and explanations thereof will be omitted.

To the pH control tank 12, from the dissolution reaction tank 8, the slurry S1 in which CaO and $Ca(OH)_2$ are converted to $CaSO_4$ and $CaCO_3$ by reacting $SO_2$ and $CO_2$, is fed, and in the pH control tank 12, pH of the slurry S1 is controlled between 7.0 and 10.5 with pH controllers such as acids ($H_2SO_4$, $H_2CO_3$, HCl etc.) and alkalis (NaOH, $Ca(OH)_2$ etc.), and heavy metals contained in a liquid of the slurry S1 precipitate.

With this, in the solid/liquid separator 9 at a rear stage, when solid content C is obtained by solid/liquid separating the slurry S2 discharged from the pH control tank 12, heavy metals can unevenly be distributed on the solid content side, which can decrease chemical cost required for waste water treatment, and restrains circulation and concentration of heavy metals in the cement burning system as well.

In addition, in the above embodiment, although the dissolution reaction tank 8 and the pH control tank 12 are independently installed, it is possible to perform, in a single tank, chemical reaction between the calcium compounds and $SO_2$ gas and the pH control at the same time.

Furthermore, in the above-mentioned embodiment, although the coarse powder D1 separated in the cyclone is returned to a cement kiln system, it is also possible to further classify the coarse powder, and feed divided fine powder with a predetermined chlorine content to the dissolution reaction tank 8 so as to be treated in the same manner as the dusts D3, D4. Moreover, the dusts D3, D4 can be classified further, and only fine powder may be fed to the dissolution reaction tank 8.

EXPLANATION OF REFERENCE NUMBERS 1 chlorine bypass facility
2 cement kiln
3 probe
4 cyclone
5 heat exchanger
6 bag filter
7 dust tank
8 dissolution reaction tank
9 solid/liquid separator
10 electric dust collector
12 pH control tank

The invention claimed is:

1. A method of treating chlorine bypass dust in a chlorine bypass facility, the method comprising extracting a part of combustion gas, while cooling it, from a kiln exhaust gas passage, which runs from an inlet end of a cement kiln to a bottom cyclone, and recovering a chlorine bypass dust including compounds of calcium from the extracted gas, obtaining solid content by contacting a slurry including the chlorine bypass dust and a calcium compound with $SO_2$ gas or/and $CO_2$ gas, the $SO_2$ gas being received from a bag filter disposed between the kiln exhaust gas passage and a dissolution tank including the slurry, the $CO_2$ gas being exhaust gas from the cement kiln, added to the slurry via a gas introduction device separate from the kiln exhaust passage such that the $SO_2$ or/and $CO_2$ gas being added to the slurry separate from the chlorine bypass dust, and determining time for reacting the slurry containing the chlorine bypass dust to the $SO_2$ gas or/and the $CO_2$ gas by at least one selected from the group consisting of: rate of decrease in the $SO_2$ gas or/and the $CO_2$ gas when obtaining the solid content; pH of the slurry after being reacted with the $SO_2$ gas or/and the $CO_2$ gas, and chemical analysis of a concentration of calcium compounds in the chlorine bypass dust.

2. The method of treating chlorine bypass dust as claimed in claim 1, wherein said slurry containing chlorine bypass dust and an exhaust gas from the chlorine bypass facility or/and the exhaust gas from the cement kiln are contacted with each other.

3. The method of treating chlorine bypass dust as claimed in claim 1, wherein said solid content is fed to a cement finishing process.

4. The method of treating chlorine bypass dust as claimed in claim 1, wherein said solid content is obtained after controlling pH of said slurry containing the chlorine bypass dust after contacted with the $SO_2$ gas or/and the $CO_2$ gas.

5. The method of treating chlorine bypass dust as claimed in claim 4, wherein said pH of the slurry after being contacted with the $SO_2$ gas or/and the $CO_2$ gas is between 7.0 and 10.5.

6. The method of treating chlorine bypass dust as claimed in claim 2, wherein said solid content is fed to a cement finishing process.

7. The method of treating chlorine bypass dust as claimed in claim 2, wherein said solid content is obtained after controlling pH of said slurry containing the chlorine bypass dust after contacted with the $SO_2$ gas or/and the $CO_2$ gas.

8. The method of treating chlorine bypass dust as claimed in claim 7, wherein said pH of the slurry after being contacted with the $SO_2$ gas or/and the $CO_2$ gas is between 7.0 and 10.5.

9. The method of treating chlorine bypass dust as claimed in claim 3, wherein said solid content is obtained after controlling pH of said slurry containing the chlorine bypass dust after being contacted with the $SO_2$ gas or/and the $CO_2$ gas.

10. The method of treating chlorine bypass dust as claimed in claim 9, wherein said pH of the slurry after contacted with the $SO_2$ gas or/and the $CO_2$ gas is controlled 7.0 or more and 10.5 or less.

11. The method of treating chlorine bypass dust as claimed in claim 1, wherein $SO_2$ gas and $CO_2$ gas are added to the slurry.

* * * * *